US012179994B2

(12) United States Patent
Förstmann et al.

(10) Patent No.: US 12,179,994 B2
(45) Date of Patent: Dec. 31, 2024

(54) PACKAGING FOR PRODUCTS OF THE TOBACCO INDUSTRY, AND METHOD AND APPARATUS FOR PRODUCING SAME

(71) Applicant: Focke & Co. (GmbH & Co. KG), Verden (DE)

(72) Inventors: Dirk Förstmann, Verden (DE); Christoph Schneider, Verden (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 160 days.

(21) Appl. No.: 17/781,656

(22) PCT Filed: Dec. 8, 2020

(86) PCT No.: PCT/EP2020/085097
§ 371 (c)(1),
(2) Date: Jun. 1, 2022

(87) PCT Pub. No.: WO2021/116112
PCT Pub. Date: Jun. 17, 2021

(65) Prior Publication Data

US 2023/0002146 A1 Jan. 5, 2023

(30) Foreign Application Priority Data

Dec. 12, 2019 (DE) ........................ 102019134157.4

(51) Int. Cl.
*B65D 85/10* (2006.01)
*B31B 50/14* (2017.01)
(Continued)

(52) U.S. Cl.
CPC ........ *B65D 85/10484* (2020.05); *B31B 50/14* (2017.08); *B31B 50/26* (2017.08);
(Continued)

(58) Field of Classification Search
CPC .......... B65D 85/10484; B65D 85/1056; B65D 85/1054
(Continued)

(56) References Cited

U.S. PATENT DOCUMENTS 4,850,482 A * 7/1989 Campbell ............ B65D 5/5052
206/268
5,066,270 A 11/1991 Tomanovits
(Continued)

FOREIGN PATENT DOCUMENTS

CN 1273557 A 11/2000
CN 101628651 A 1/2010
(Continued)

OTHER PUBLICATIONS

WIPO, International Search Report (in a related application), Mar. 11, 2021.
(Continued)

*Primary Examiner* — Jacob K Ackun
(74) *Attorney, Agent, or Firm* — Laurence P. Colton; Smith Tempel Blaha LLC

(57) ABSTRACT

A packaging for products of the tobacco industry, wherein the packaging has a box portion and a lid which is pivotably arranged on the box portion by means of a line hinge, and wherein a packaging content is arranged in the box portion, and wherein the packaging has a collar which at least partially surrounds the packaging content at several sides and which protrudes with the packaging content from the box portion which is open at the top. There is provision for walls of the collar to extend from a front side of the box portion up to the region of an opposing rear side of the box portion on which the line hinge is also located. A method and an apparatus for producing such a packaging.

10 Claims, 9 Drawing Sheets

(51) Int. Cl.
*B31B 50/26* (2017.01)
*B31F 1/08* (2006.01)

(52) U.S. Cl.
CPC ............ *B31F 1/08* (2013.01); *B65D 85/1054* (2013.01); *B65D 85/1056* (2020.05)

(58) Field of Classification Search
USPC .................................................. 206/271, 273
See application file for complete search history.

(56) References Cited

U.S. PATENT DOCUMENTS

| | | | | |
|---|---|---|---|---|
| 5,465,837 | A * | 11/1995 | Focke | B65D 85/1027 206/268 |
| 5,558,217 | A * | 9/1996 | Focke | B65D 85/1045 206/86 |
| 6,311,834 | B1 * | 11/2001 | Focke | B65D 5/6691 206/268 |
| 7,455,176 | B2 * | 11/2008 | Focke | B65D 85/10484 206/268 |
| 7,717,260 | B2 * | 5/2010 | Buse | B65D 85/1045 206/268 |
| 8,069,981 | B2 * | 12/2011 | Buse | B65D 5/6691 206/273 |
| 8,418,846 | B2 * | 4/2013 | Tanbo | B65D 5/4266 206/268 |
| 8,800,761 | B2 * | 8/2014 | Lutzig | B65D 5/6694 206/268 |
| 2005/0218200 | A1 * | 10/2005 | Focke | B65D 85/1048 229/110 |
| 2006/0249564 | A1 | 11/2006 | Dhanda | |
| 2009/0078599 | A1 * | 3/2009 | Tanbo | B65D 5/445 206/268 |
| 2010/0044255 | A1 * | 2/2010 | Tanbo | B65D 5/4266 206/268 |
| 2011/0233080 | A1 * | 9/2011 | Bertuzzi | B65D 85/10564 206/268 |
| 2012/0006823 | A1 * | 1/2012 | Bertuzzi | B65D 75/5838 53/461 |
| 2013/0098786 | A1 * | 4/2013 | Collins | A23G 3/0231 206/268 |
| 2014/0374291 | A1 * | 12/2014 | Young | B65D 85/10 206/268 |
| 2015/0090618 | A1 * | 4/2015 | Marchitto | B65D 5/6688 206/268 |
| 2015/0336348 | A1 * | 11/2015 | Beutler | B65D 5/18 428/192 |
| 2016/0016723 | A1 * | 1/2016 | Hodges | B65D 5/4266 206/242 |
| 2016/0229620 | A1 * | 8/2016 | Steinkamp | B65D 77/30 |
| 2018/0282056 | A1 | 10/2018 | Nishide | |
| 2019/0008204 | A1 | 1/2019 | Holford | |

FOREIGN PATENT DOCUMENTS

| | | | |
|---|---|---|---|
| DE | 19741481 | A1 | 3/1999 |
| DE | 19847433 | A1 | 4/2000 |
| DE | 10047447 | A1 | 5/2001 |
| DE | 102013101118 | A1 | 8/2014 |
| DE | 102014010615 | A1 | 1/2016 |
| EP | 2923968 | A1 | 9/2015 |
| EP | 2977334 | A1 | 1/2016 |
| GB | 1086725 | A | 10/1967 |
| GB | 2451180 | A | 1/2009 |
| WO | 2014203184 | A1 | 12/2014 |
| WO | 2016035046 | A1 | 3/2016 |
| WO | 2016041621 | A1 | 3/2016 |
| WO | 2016166692 | A1 | 10/2016 |

OTHER PUBLICATIONS

Deutsches Patent—Und Markenamt (German Patent and Trademark Office), Recherchebericht (search in a related application), Aug. 6, 2020.

China National Intellectual Property Administration, Notification of the First Office Action (in a corresponding application), Aug. 30, 2024.

* cited by examiner

PACKAGING FOR PRODUCTS OF THE TOBACCO INDUSTRY, AND METHOD AND APPARATUS FOR PRODUCING SAME

CROSS REFERENCE TO RELATED APPLICATIONS

This application is the US National Phase of and claims the benefit of and priority on International Application No. PCT/EP2020/085097 having a filing date of 8 Dec. 2020, which claims priority on and the benefit of German Patent Application No. 10 2019 134 157.4 having a filing date of 12 Dec. 2019.

BACKGROUND OF THE INVENTION

Technical Field

The invention relates to a packaging for products of the tobacco industry, wherein the packaging has a box portion and a lid which is pivotably arranged on the box portion by means of a line hinge, and wherein a packaging content is arranged in the box portion, and wherein the packaging has a collar which at least partially surrounds the packaging content at several sides and which protrudes with the packaging content from the box portion which is open at the top.

Prior Art

Such packagings are known in practice in numerous variants. In this regard, an object of the invention is to develop packagings of the type mentioned in the introduction with particular regard to an improved producibility of the packagings.

BRIEF SUMMARY OF THE INVENTION

A packaging to achieve this objective is a packaging for products of the tobacco industry, wherein the packaging has a box portion and a lid which is pivotably arranged on the box portion by means of a line hinge, and wherein a packaging content is arranged in the box portion, and wherein the packaging has a collar which at least partially surrounds the packaging content at several sides and which protrudes with the packaging content from the box portion which is open at the top, characterized in that walls of the collar extend from a front side of the box portion up to the region of an opposing rear side of the box portion on which the line hinge is also located. There is accordingly provision for walls of the collar to extend from a front side of the box portion up to the region of an opposing rear side of the box portion on which the line hinge is also located.

An advantage of the collar walls in the region of the rear side of the box portion or the packaging content may involve the stability of the collar being improved thereby. This also enables larger recesses in the collar, for example, in the region of a collar front wall.

A specific feature may involve, in particular to delimit walls of the collar, forming in the material of the collar weakening lines which are configured to lead to a material weakening along the respective weakening line, wherein the collar has differently constructed weakening lines, of which at least some lead to a differing degree of material weakening.

The use of different weakening lines having a different degree of material weakening may contribute to the folding behavior of the collar being influenced in a positive manner in order, for example, to determine at which location or weakening line a blank first bends when folding.

Preferably, there may specifically be provision for the collar to have a collar front wall, collar side walls and collar rear walls which extend along corresponding walls of the box portion, in particular along a box front wall, box side walls and a box rear wall, and, in the transition from the collar side walls to the collar rear wall and/or in the transition from the collar side walls to the collar front wall for differently constructed weakening lines which lead to a differing degree of material weakening to be arranged.

In a packaging with chamfered packaging edges or in a packaging with right-angled packaging edges, there may be provision for there to be arranged between the collar side walls and the collar rear wall an oblique collar edge wall which extends when viewed from above obliquely with respect to the respective collar side walls and the collar rear wall, and for the weakening lines between the collar side walls and the respective oblique collar edge wall to have a lower degree of material weakening than the weakening lines between the oblique collar edge walls and the collar rear wall.

In particular, there may be provision, in a packaging with chamfered packaging edges, for there to be arranged between the collar side walls and the collar front wall an oblique collar edge wall which extends when viewed from above obliquely with respect to the respective collar side walls and the collar front wall, and for the weakening lines between the collar front wall and the adjacent oblique collar edge wall in each case to have a lower degree of material weakening than the weakening lines between the oblique collar edge walls mentioned and the respective adjacent collar side wall.

In a packaging with rounded packaging edges, there may be provision for there to be arranged in each case between the collar side walls and the collar rear wall a curved intermediate collar wall which has preferably parallel creases which are arranged with short spacings as weakening lines, and for the weakening lines in the transition from the collar side walls to the respective intermediate collar wall to have a lower degree of material weakening than weakening lines in the transition from the respective intermediate collar walls to the collar rear wall.

In particular there may be provision in packagings with rounded packaging edges for there to be arranged in each case between the collar side walls and the collar front wall a curved intermediate collar wall which has preferably parallel creases which are arranged with short spacings as weakening lines, and for weakening lines in the transition from the collar front wall to the adjacent intermediate collar walls to have a lower degree of material weakening than weakening lines in the transition from the intermediate collar walls mentioned to the adjacent collar side wall.

In a preferred embodiment, weakening lines with a larger degree of material weakening may be formed, for example, by scoring the material of the collar and weakening lines with a lower degree of material weakening may be formed, for example, by creasing the material of the collar.

As already mentioned above as a possible advantage, it is conceivable, as a result of the use of the weakening lines with a differing degree of material weakening, for the folding behavior of the blank for the collar to be able to be influenced, in particular in such a manner that walls of the collar which are located at weakening lines with a lower degree of material weakening are more difficult to fold than walls of the collar which are located at weakening lines with a higher degree of material weakening.

Another specific feature may involve the collar rear walls preferably extending together over at least 10% of the width of the rear wall of the box portion, preferably over at least 20%, more preferably over at least 30%.

An advantage of such solutions may involve the collar being reinforced, but, on the other hand, not with an unnecessarily excessive amount of material being used.

Furthermore, the invention relates to a method for producing a packaging for products of the tobacco industry, wherein a group of products of the tobacco industry in an inner wrapper as packaging content of the packaging and a blank for a collar of the packaging is supplied to a platform, and wherein the platform is moved back and forth in the direction of a folding turret which is arranged downstream of the platform in order to bridge the spacing therefrom, and wherein in pockets of the folding turret preferably partially folded blanks for an outer packaging of the packaging are provided in each case, and wherein the packaging content is moved together with the collar which is folded around the packaging content by means of a sliding member from the platform into a pocket facing the platform or the partially folded blank which is provided therein and subsequently the blank is folded around the packaging content and the collar to form a packaging.

Known apparatuses of this type are not capable of folding collars, as required, for example, to produce the packaging according to the invention.

An object of this aspect of the apparatus is consequently to propose measures which enable a simple production of such packagings.

A method according to the invention for achieving this objective has a provision for the blank for the collar to be folded at all sides around the packaging content on the platform.

It has surprisingly been found that the platform can be adapted with relatively little complexity in such a manner that a collar which is located on all sides of the packaging content can be folded.

There is preferably provision for the blank for the collar to be folded around the packaging content on the platform in such a manner that a collar front wall extends in the region of a front side of the packaging content, collar side walls extend in the region of narrow sides of the packaging content and collar rear walls extend in the region of a rear side of the packaging content opposite the front side.

There is further preferably provision for the blank for the collar to be folded during transport along the platform, wherein there is preferably provision for the blank and the packaging content to be transported along the platform by an in particular common sliding member.

In a preferably first folding step, the collar side walls may be folded with respect to the collar front wall, in particular by means of folding using one or more switches and in conjunction with folding elements which are associated with the switches and which are preferably positioned in a fixed manner on the platform.

In this instance, there may be provision for the folding of the collar side walls to be carried out with spacing with respect to the packaging content, and afterwards for the partially folded collar to be combined with the packaging content, preferably by means of at least one guide, in particular by placing the collar front wall against the front side of the packaging content.

In particular, there may be provision, preferably in the first folding step, for the collar side walls to be folded through approximately 90° with respect to the collar front wall so that they extend along the narrow sides of the packaging content, wherein the collar rear walls extend beyond the plane of the rear side of the packaging content.

Preferably, in a second folding step, the collar rear walls can be folded around the packaging content so that they extend along the rear side of the packaging content.

A specific feature may involve the collar which is folded around the packaging content being fixed by a preferably second sliding member in the relative position thereof with respect to the packaging content, and for the packaging content with the collar folded around it to be moved by the preferably second sliding member from the platform into a pocket facing the platform or the partially folded blank which is provided therein.

In particular, this may be carried out in such a manner that the preferably second sliding member in the region of two opposing sides fixes the folded collar in its position on the packaging content, in particular in the region of a front side which preferably faces upward and in the region of a rear side of the packaging content which preferably faces downward.

The invention further relates to an apparatus for producing a packaging for products of the tobacco industry, having a platform for supplying a group of products of the tobacco industry in an inner wrapper as packaging content of the packaging and a blank for a collar of the packaging in the direction of a folding turret which is arranged downstream of the platform, wherein the folding turret has pockets for receiving preferably partially folded blanks for an outer packaging of a packaging, and wherein a sliding member is provided in order to move the packaging content together with the collar which is folded around the packaging content from the platform into a pocket facing the platform or the partially folded blank which is provided therein.

According to the invention, there is provision for there to be provided in the region of the platform folding members which are configured to fold the blank for the collar around the packaging content on the platform.

There may further be provision for the folding members to be configured to fold the blank for the collar around the packaging content on the platform in such a manner that a collar front wall extends in the region of a front side of the packaging content, collar side walls extend in the region of narrow sides of the packaging content and collar rear walls extend in the region of a rear side of the packaging content opposite the front side.

There is preferably provision for the folding members to be configured to fold the blank for the collar during transport along the platform, wherein an in particular common sliding member is preferably provided in order to transport the blank and the packaging content along the platform.

There may further be provision for the platform to have one or more switches and preferably fixed folding elements which are associated with the switches, for a preferably first folding step in which the collar side walls are folded with respect to the collar front wall.

Another specific feature may involve the folding elements being configured to carry out the folding of the collar side walls with spacing with respect to the packaging content and for at least one guide to be provided in order to combine the partially folded collar with the packaging content, in particular by placing the collar front wall against the front side of the packaging content.

There is preferably provision for additional folding elements to be provided in the region of the platform in order preferably in a second folding step to fold the collar rear walls around the packaging content so that they extend along the rear side of the packaging content.

In a preferred embodiment, there may be provision for the additional folding elements to be arranged below a guide path of the platform, along which the packaging content is transported with the collar, and for the folding elements to be able to be moved in opposing directions in order to fold the two collar rear walls against the rear side of the packaging content.

Another specific feature may involve a preferably second sliding member being provided in order to fix the collar which is folded around the packaging content in the relative position thereof with respect to the packaging content and for the preferably second sliding member to be configured to move the packaging content with the collar folded around it from the platform into the pocket facing the platform or the partially folded blank which is provided therein.

This can be carried out in such a manner that the preferably second sliding member is configured in the region of two opposing sides to fix the folded collar in the position thereof on the packaging content, in particular in the region of a preferably upwardly facing front side and in the region of a preferably downwardly facing rear side of the packaging content.

Another specific feature may involve the platform having a guide path on which the packaging content rests during transport along the platform and for the guide path to have recesses, in particular in order to form a working region for folding members in order to fold the collar rear walls or to form at least one recess for retention members of the preferably second sliding member.

Other specific features will be further appreciated from the description and the drawings.

BRIEF DESCRIPTION OF THE DRAWINGS

The invention is described below with reference to preferred embodiments illustrated in the drawings, in which.

DETAILED DESCRIPTION OF PREFERRED EMBODIMENTS

Figure 2:
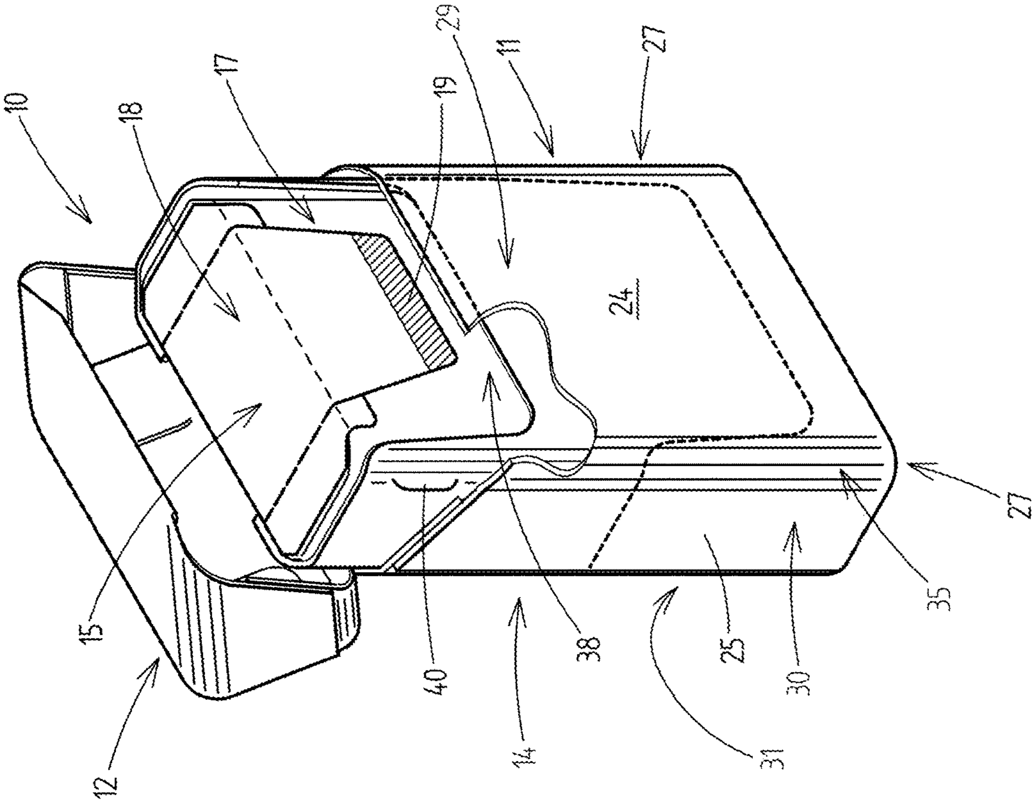
FIG. 2 shows a second embodiment of a packaging in an illustration similar to FIG. 1.

The packaging 10 according to the invention is described below with reference to three packaging variants. All three packagings 10 are packagings 10 of the hinge/lid type. The packagings 10 accordingly have a cup-like (lower) box portion 11 and an (upper) lid 12. The lid 12 is pivotably supported on the box portion 11, that is to say, by means of a line hinge 13. The box portion 11 and lid 12 form an outer packaging 14.

The outer packaging 14 may be formed from a conventional blank for a hinge/lid packaging. Cardboard is generally used as the material of the blank. Walls of the blank may be delimited from each other by means of embossed folding lines or stamped portions.

A packaging content 15 is arranged in the box portion 11 (which is open at the top). In this instance, the packaging content 15 is a cigarette group 16 which is enclosed in an inner wrapper 17. Of course, in place of cigarettes, other products from the cigarette industry can also be provided as content.

In the context of the application, products of the cigarette industry are intended to be understood to be tobacco products, such as cigarettes, cigarillos and the like, but also new types of tobacco products, such as, for example, heat-not-burn products or liquid carriers for E cigarettes.

It is conceivable for the inner wrapper 17 to be constructed as a film sealing block having a removal opening which extends in the region of the upper side and a front side of the inner wrapper 17 and which can be closed by means of a closure label 18.

In this instance, the closure label 18 has a touching tip 19 for confirmation by the consumer. However, it is also conceivable for the touching tip 19 or the closure label 18 to be adhesively bonded to the inner side of the lid 12 so that the closure label 18 is automatically opened or closed when the lid 12 is activated accordingly.

The packaging content 15 readily protrudes in conventional manner from the box portion 12. The packaging content 15 is at least partially surrounded by a collar 20 which is secured in the box portion 11 and the packaging content 15 protrudes therefrom.

The collar 20 is formed from a separate blank made of packaging material (for example, made from cardboard) and has in this instance substantially five walls, that is to say, a central collar front wall 21, two adjacent collar side walls 22 and two adjacent collar rear walls 23 in each case. The walls 21, 22, 23 of the collar 20 extend along corresponding walls of the box portion 11, that is to say, along a box front wall 24, box side walls 25 and (partially) along a box rear wall 26. Other walls or wall portions are described below.

The walls 21, 22, 23 of the collar 20 are delimited from each other by means of weakening lines. In this instance, they may (also) be conventional (embossed) folding lines. The weakening lines lead in the blank for the collar 20 to a material weakening which extends along the weakening line.

Figure 1:
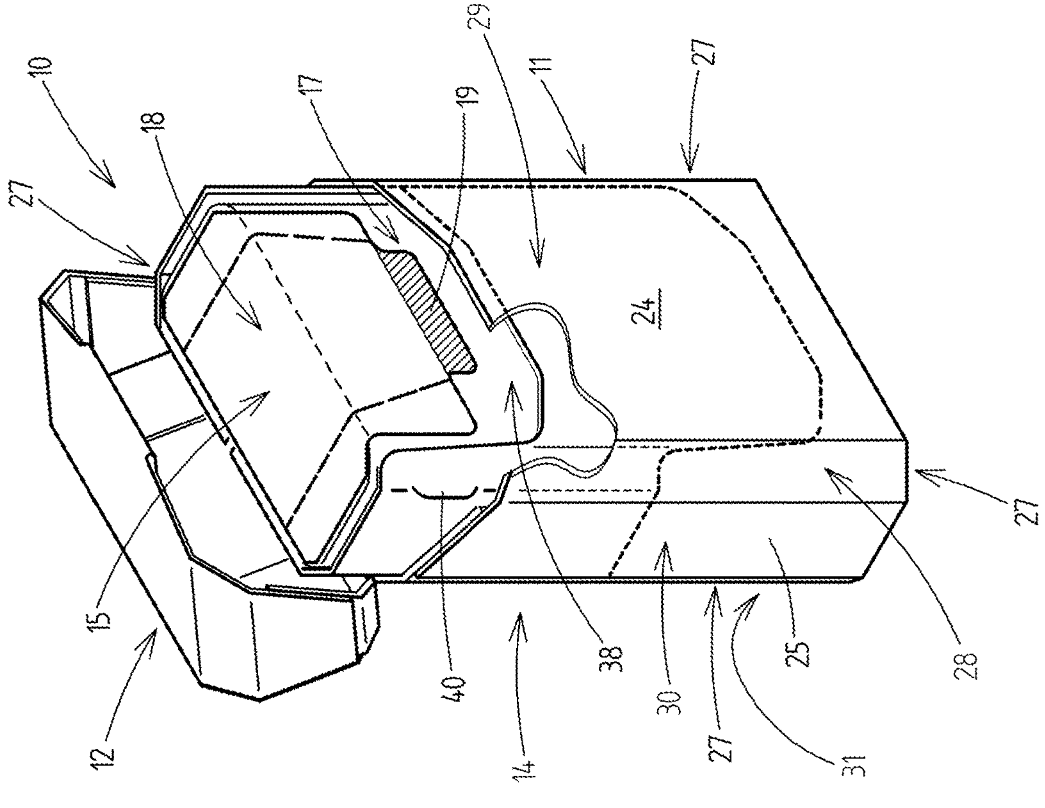
FIG. 1 shows a first embodiment of a packaging for products of the tobacco industry as a spatial illustration with an open lid.

A particular feature involves a few weakening lines being constructed in such a manner that they lead to a more powerful material weakening than other weakening lines and in particular than the conventional folding lines. Since the arrangement is dependent on the respective packaging type, the individual packaging variants will be discussed below:

The packaging 10 shown in FIG. 1 is a so-called oblique edge packaging 10 in which the upright packaging edges 27 of the packaging 10 are constructed to be chamfered. Such packagings 10 are also referred to as octagonal packagings 10.

The chamfered packaging edges 27 are formed using oblique packaging edge walls 28 which are arranged between a packaging front wall 29 and the two adjacent packaging side walls 30 and/or between the packaging rear wall 31 and the two packaging side walls 30.

The oblique packaging edge walls 28 may, for example, be arranged at an angle of approximately 45° with respect to the adjacent walls 29, 30, 31 of the packaging 10.

Figure 5:
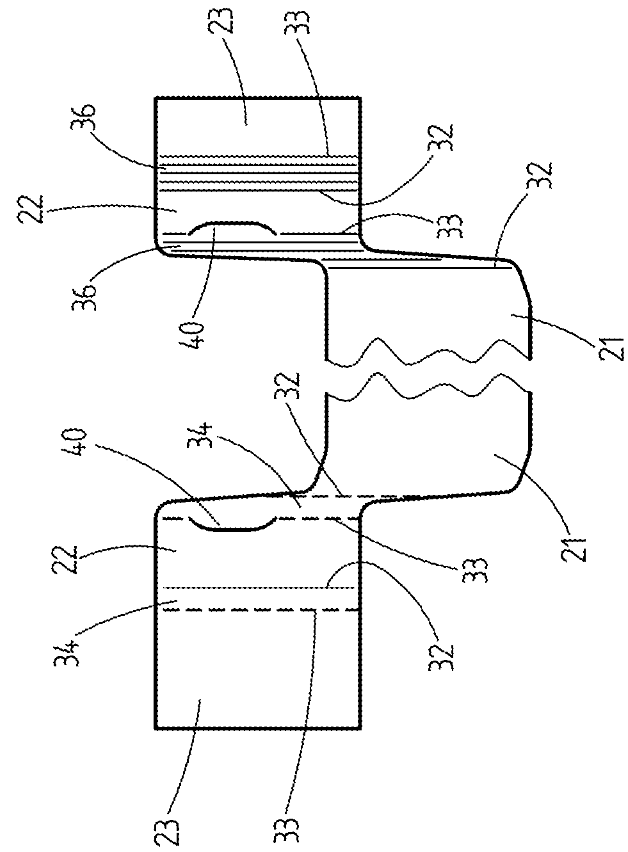
FIG. 5 shows two variants of a blank for a collar for a packaging according to FIG. 1 or 2.

FIG. 5 shows in the left half a corresponding portion of a blank for the collar 20 according to FIG. 1. In this instance, the weakening lines 32 are constructed in such a manner that a lower level of material weakening is produced than by the weakening lines 33. The weakening lines 32 may, for example, be formed by a creasing, whereas the weakening lines 33 may be formed by a scoring.

The differing degrees of material weakening may also be formed in a different manner. It is conceivable, for example, for both weakening lines 32, 33 to be produced in the same manner, for example, both by means of creasing or both by means of scoring. As a result of modification of the creasing or the scoring, for example, as a result of a deeper creasing or deeper and/or longer scores, different levels of material weakening can then be brought about. It is further conceivable for different methods for producing the weakening lines 32, 33 to be combined with different modifications.

In this instance, there is provision for the material weakening to be constant over the path of a respective weakening line 32, 33.

Of course, forms other than creasing or scoring can be used to form weakening lines.

FIG. 5 also shows that the collar 20 is adapted to the shape of the packaging 10, that is to say, by means of additional oblique collar edge walls 34 between the respective collar side walls 22 and the collar rear walls 23, on the one hand, and the collar front wall 21, on the other hand.

Consequently, the weakening lines 33 are thus arranged between the collar rear walls 23 and the respective adjacent oblique collar edge wall 34 and, furthermore, between the collar side walls 22 and the front oblique collar edge wall 34. The weakening lines 32 are arranged between the collar side walls 22 and the rear oblique collar edge walls 34 and between the collar front wall 21 and the adjacent front oblique collar edge walls 34.

The packaging 10 according to FIG. 2 is a so-called round edge packaging 10, in which the upright packaging edges 27 are constructed as rounded packaging edges 27. Accordingly, between the packaging front wall 29 and the adjacent packaging side walls 30 and between the packaging rear wall 31 and the adjacent packaging side walls 30, there are formed intermediate packaging walls 35 which are rounded when viewed from above. To this end, the intermediate walls 35 are provided with weakening lines 32, 33 which preferably extend parallel and with little spacing from each other.

The blank for the collar (FIG. 5, right half) has corresponding intermediate collar walls 36. In this instance, the weakening lines 32, 33 are arranged in a similar manner to the embodiment according to the packaging 10.

Figure 3:
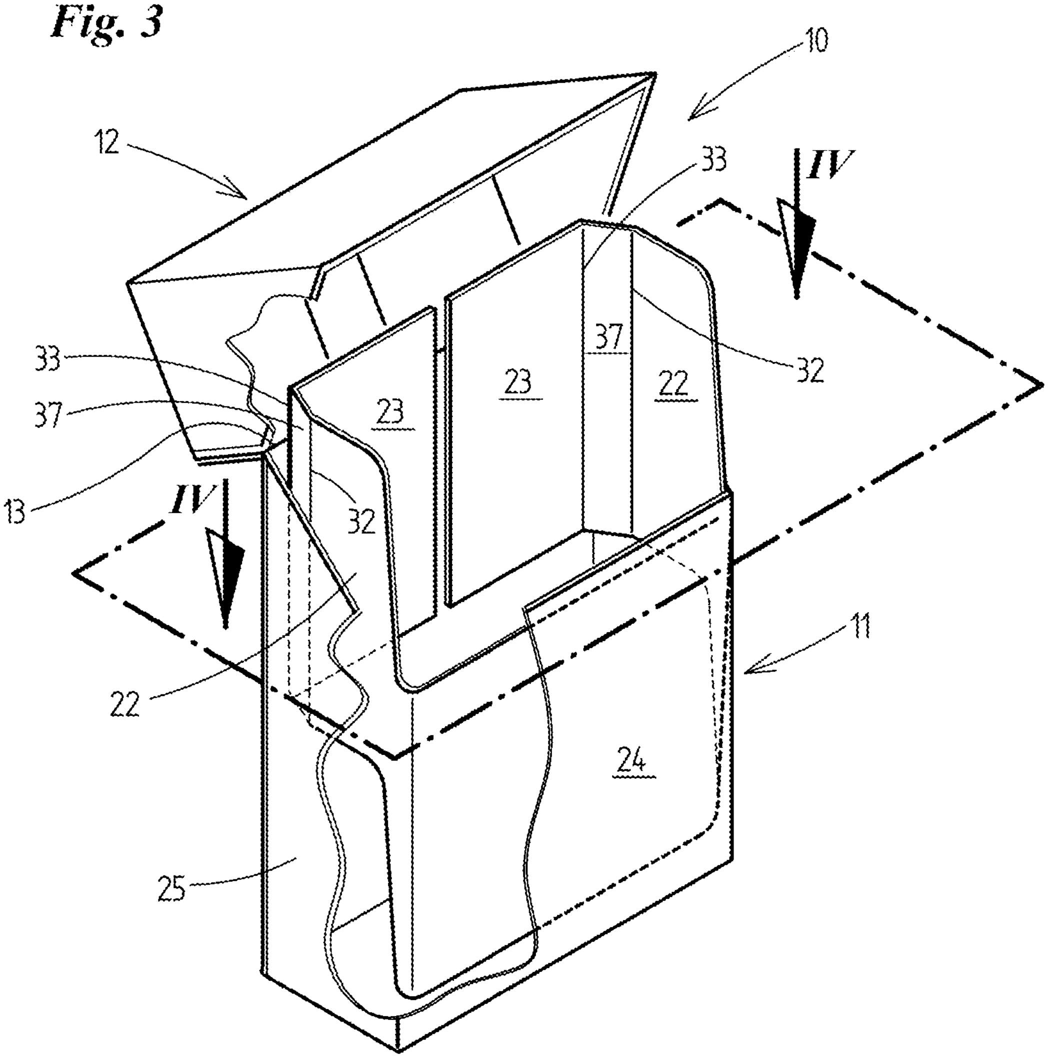
FIG. 3 shows a schematic spatial illustration of a third embodiment of a packaging.

The packaging according to FIG. 3 is a "conventional" packaging 10 with right-angled packaging edges 27. A particular feature is that, between the collar rear walls 23 and the collar side walls 22, an oblique collar edge wall 37 which extends obliquely relative to the respective collar rear walls 23 and collar side walls 22 is arranged.

In the present embodiment, no oblique collar side walls 37 are formed in the transition to the collar front wall 21. The packaging 10 also does not have such oblique edge walls.

The arrangement of the weakening lines 32 and weakening lines follows the first two embodiments.

FIGS. 1 to 3 further show that the collar 20 in the region of the collar front wall 21 has a relatively large central recess 38. A lower edge of the recess 38 is located in this instance below an upper edge (closure edge) of the box front wall 24.

It can further be seen that the collar rear walls 23 extend over a large portion of the width of the box rear wall 26. A coverage of at least 50%, at least 60%, at least 70%, at least 80% or at least 90% is conceivable.

Figure 4:
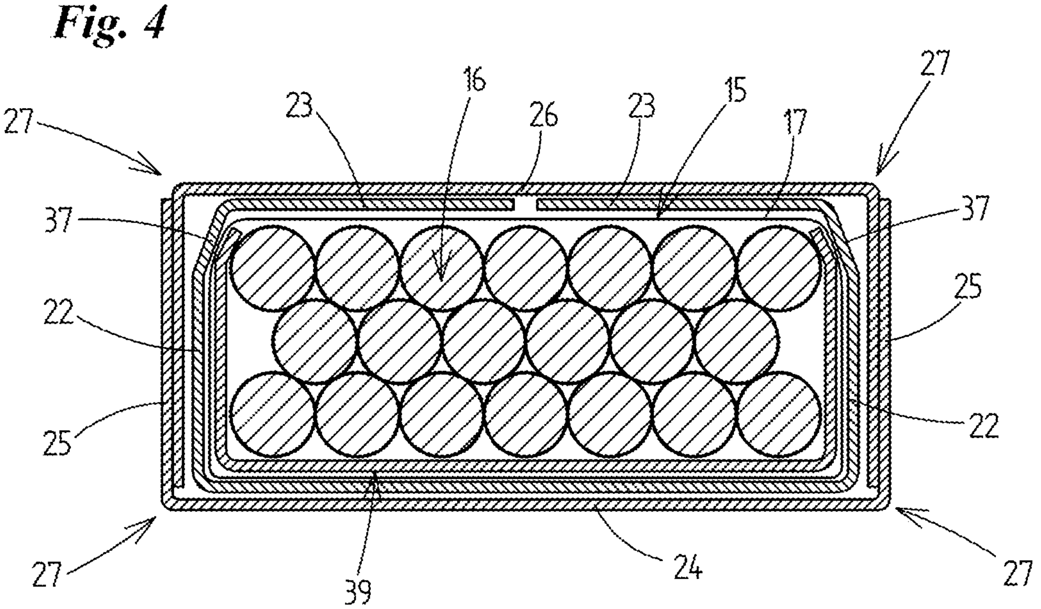
FIG. 4 shows a horizontal section through the packaging according to FIG. 4 along the line of section IV-IV in FIG. 3.

FIG. 4 further shows that, together with the cigarette group 16, a tray 39 may be arranged in the inner wrapper 17. The walls of the tray 39 extend in this instance in the region of the box front wall 24, the box side walls 25 and the oblique side wall 37. In the region of the box rear wall 26, no wall is formed.

Furthermore, lid brakes 40 are formed on the collar 20.

Figure 6:
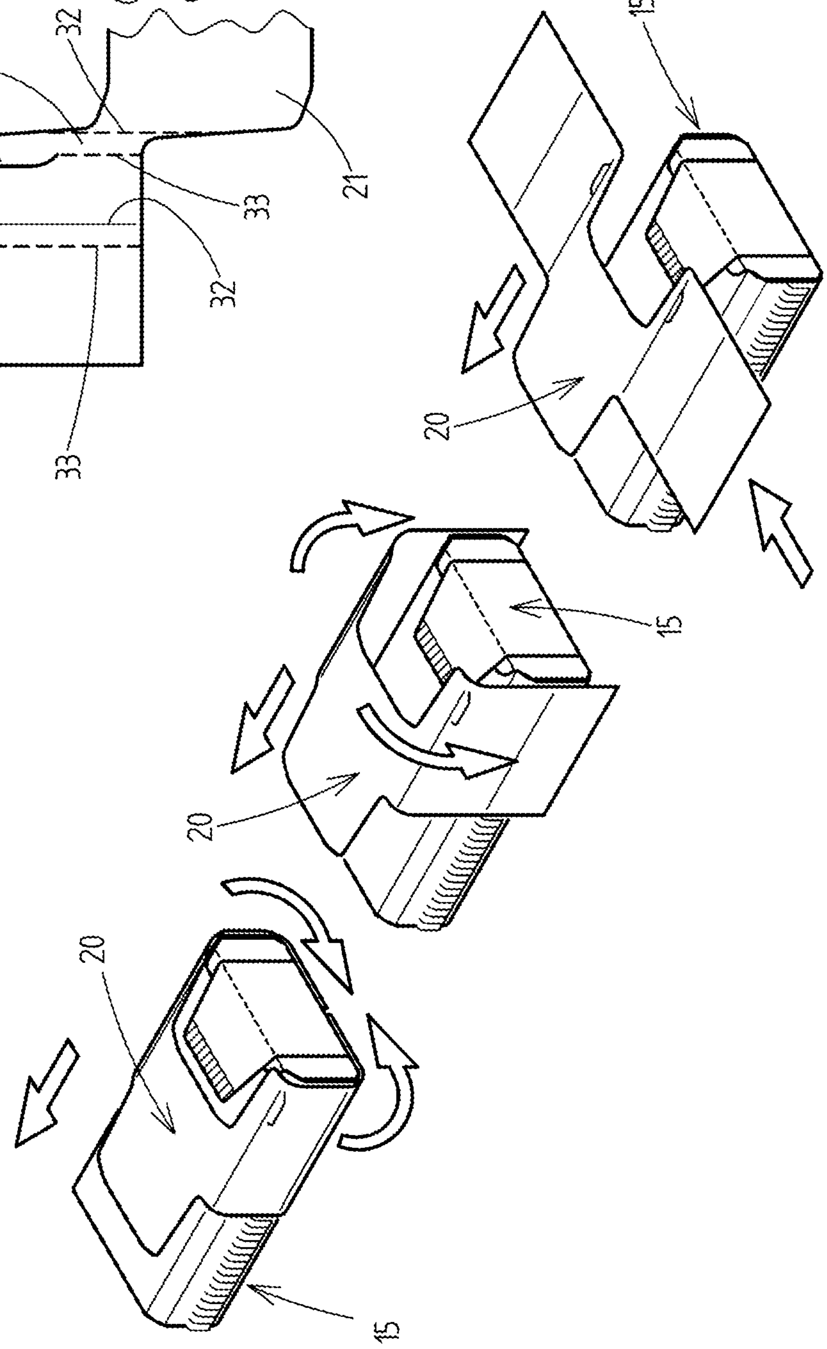
FIG. 6 shows a schematic illustration of the folding operation of the collar around the packaging content.

FIG. 6 shows the significant steps which are carried out during the arrangement of the collar 20 on the packaging content 15. The collar 20 or the blank which is expanded flat and not folded is thus transported to this end together with the packaging content 15 in a transport direction.

In a (first) folding step, the collar side walls 22 are folded with respect to the collar front wall 21. Furthermore, the collar 20 is moved into abutment with the front side of the packaging content 15.

In a (second) folding step, the collar rear walls 23 are folded into the region of the rear side of the packaging content 15. Afterwards, the packaging content 15 is introduced with the collar 20 into the (partially folded) outer packaging 14. The details will be appreciated from the following description of a corresponding apparatus.

Figure 7:
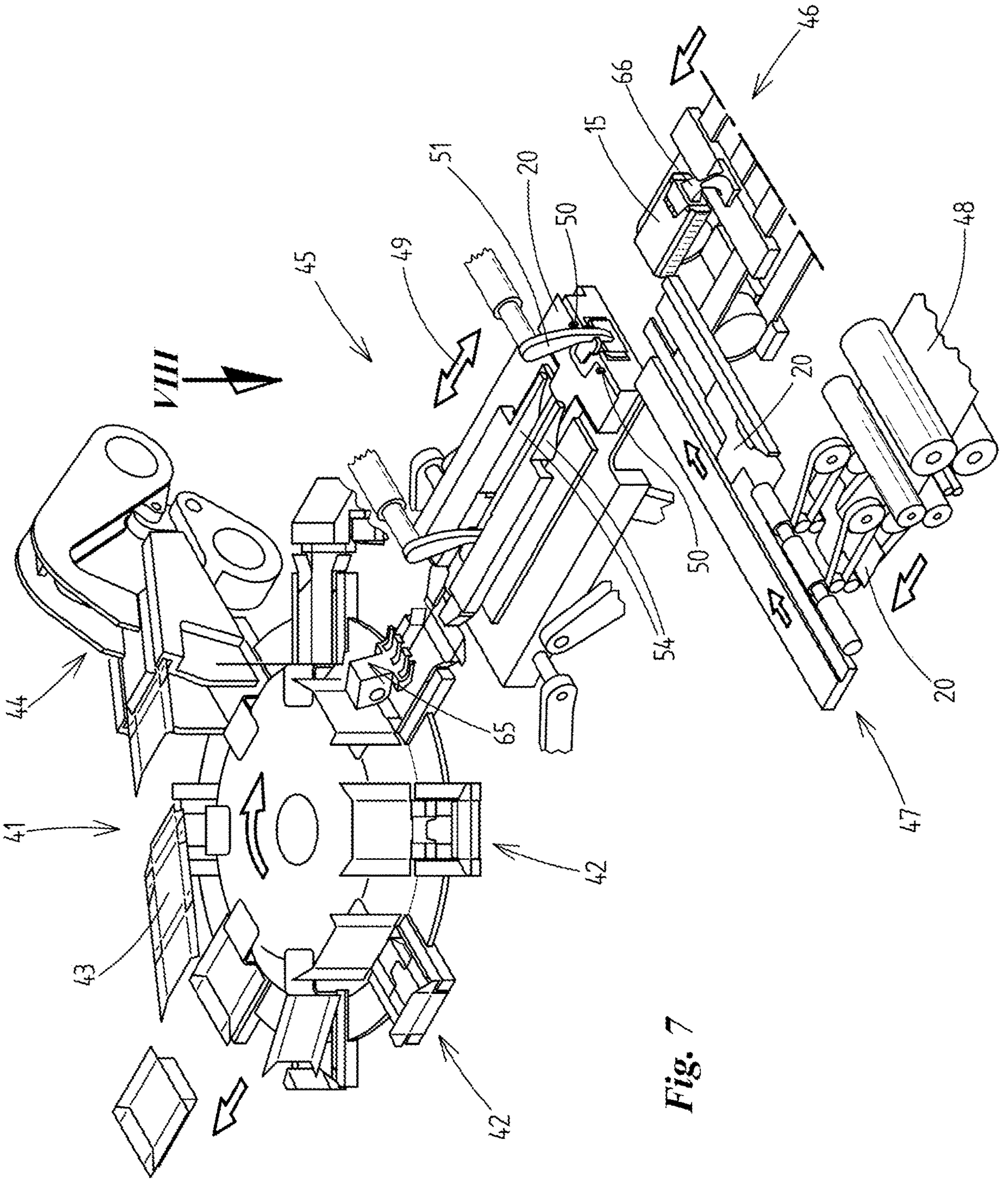
FIG. 7 shows a schematic illustration of a portion of an apparatus for producing the packagings.
Figure 8:
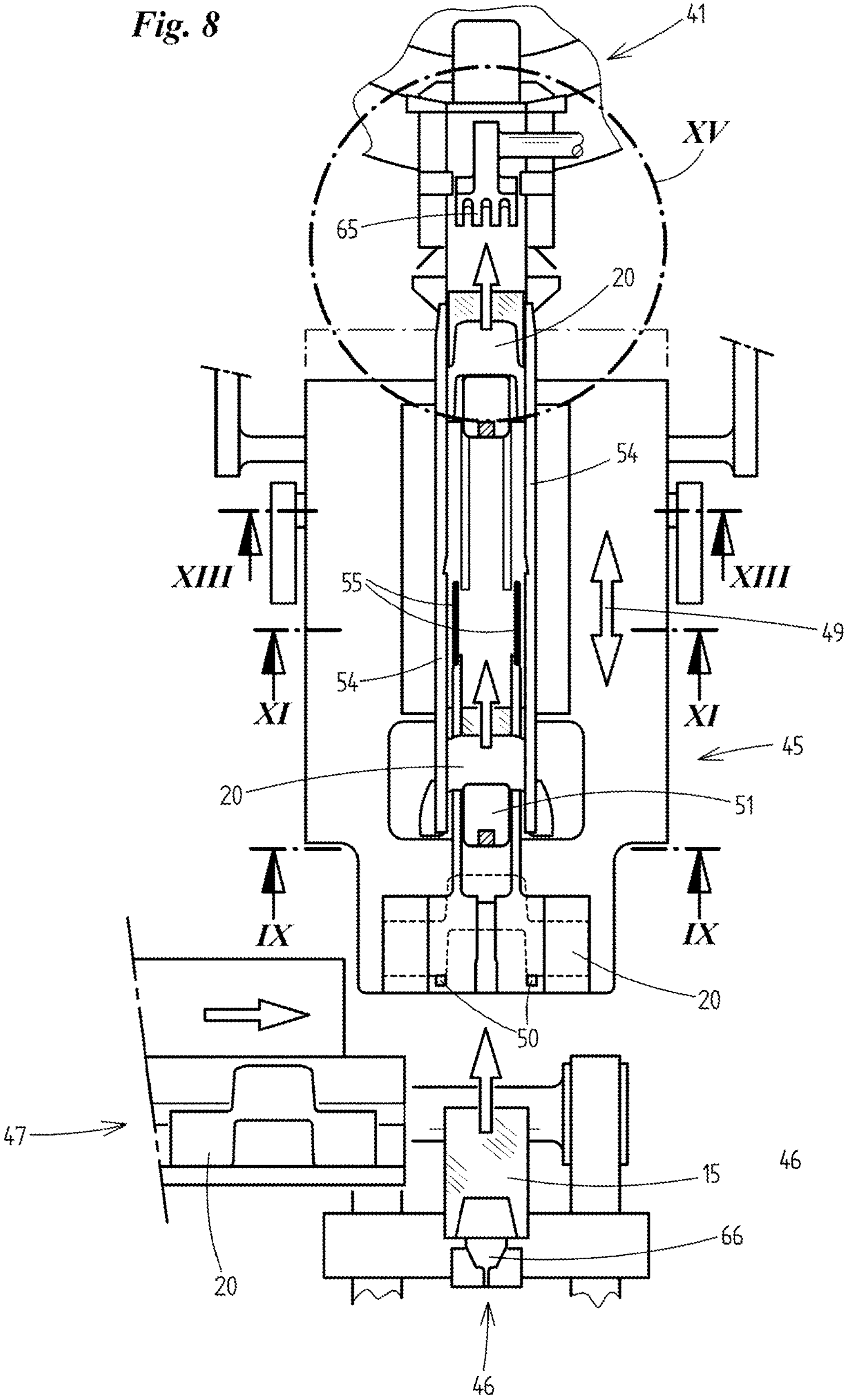
FIG. 8 shows a plan view of the apparatus according to the arrow VIII in FIG. 7.
Figure 10:
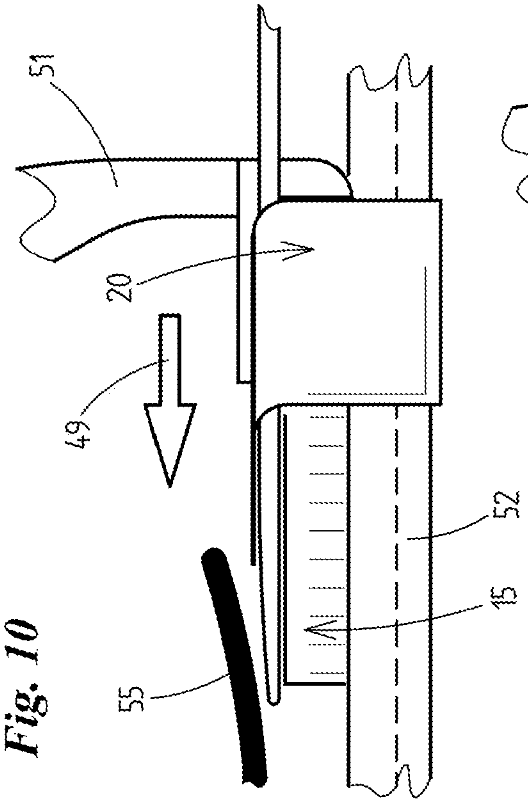
FIG. 10 shows a vertical section through the apparatus along the line of section X-X in FIG. 9.
Figure 12:
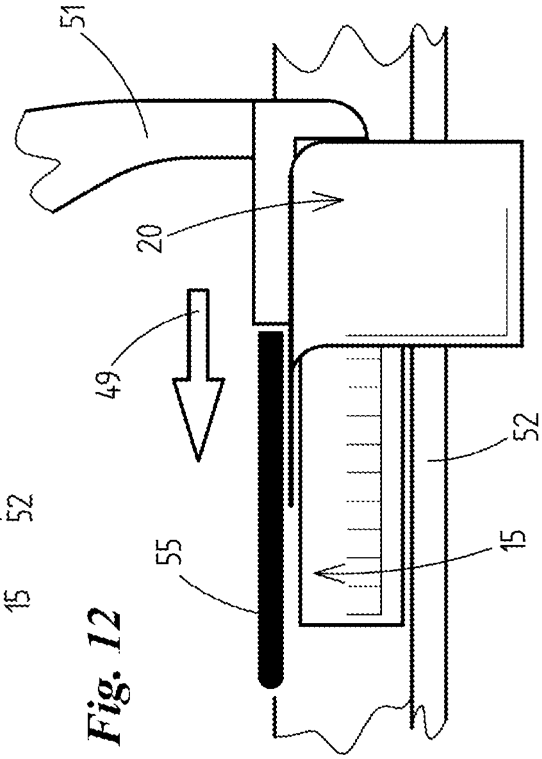
FIG. 12 shows a vertical section through the apparatus along the line of section XII-XII in FIG. 11.

The structure and the operation of an apparatus according to the invention are explained below with reference to FIGS. 7 to 17:

FIG. 7 shows significant elements of the apparatus in an overview. A folding turret 41 which in this instance is driven about a vertical axis, preferably in a cyclical rotating manner is illustrated. The folding turret 41 has pockets 42 which are distributed in a uniform manner over the circumference of the folding revolver 41 and which serve to receive partially folded blanks 43 for the outer packaging 14.

The blanks 43 are supplied along a transport path and stamped by means of a so-called beating member 44 into a pocket 42 of the folding revolver 41 and partially folded. A packaging content 15 with the collar 20 is conveyed into the pocket 42 or the blank 43. In this instance, a platform 45 is used.

The packaging content 15 is supplied along a transport path 46 of the platform 45 or transferred thereto. Transversely relative to the transport path 46, a collar 20 is transported along a transverse conveyor belt 47 and transferred to the platform 45.

FIG. 7 further shows that the collars 20 are separated form a continuous material web 48.

The platform 45 can be moved back and forth in the transport direction according to the arrow 49 in order to bridge the spacing with respect to the transport path 46 or transverse conveyor belt 47, on the one hand, and the folding turret 41, on the other hand. The construction in this regard is similar to the application set out in DE 10 2014 010 615 A1 from the same Applicant, to which reference will be made for the purposes of complete disclosure.

In order to receive the packaging content 15, the platform 45 is moved so far back that the packaging content 15 can be pushed away by means of a sliding member 66 onto the platform 45. At the same time, the collar 20 can be transported onward along the transverse conveyor belt 47 and placed on the platform 45. The collar 20 which is supplied to the platform 45 is then secured at the rear side by means of two projections 50 on the platform 45.

Afterwards, the packaging content 15 and collar 20 are pushed by means of a first sliding member 51 along the platform 45 in a transport direction 49.

Figure 9:
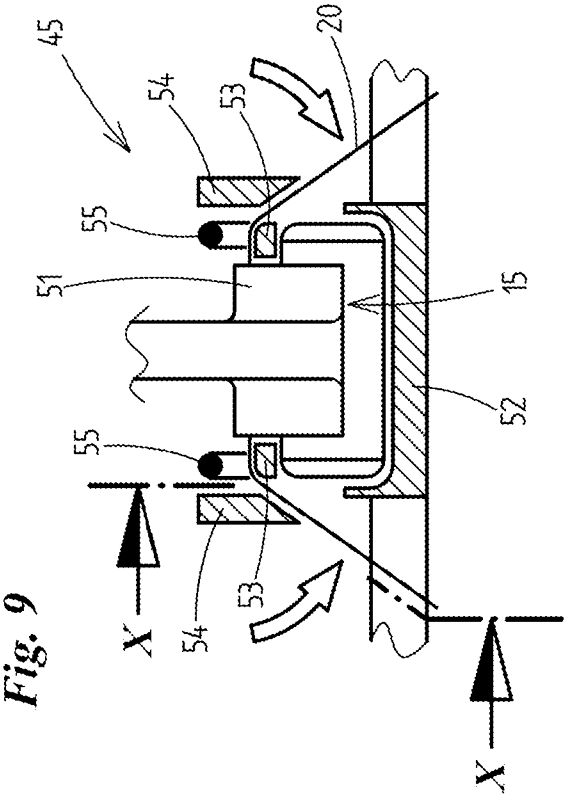
FIG. 9 shows a vertical section through the apparatus along the line of section IX-IX in FIG. 8.
Figure 11:
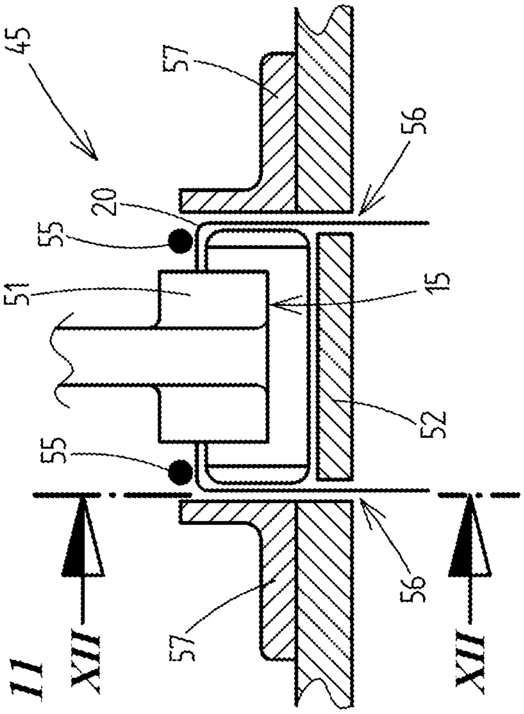
FIG. 11 shows a vertical section through the apparatus along the line of section X-X in FIG. 8.
Figure 14:
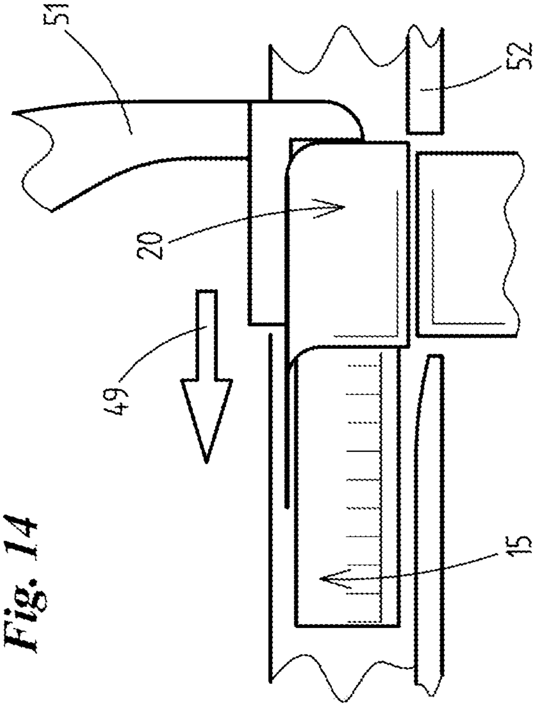
FIG. 14 shows a vertical section through the apparatus along the line of section XIV-XIV in FIG. 13.
Figure 13:
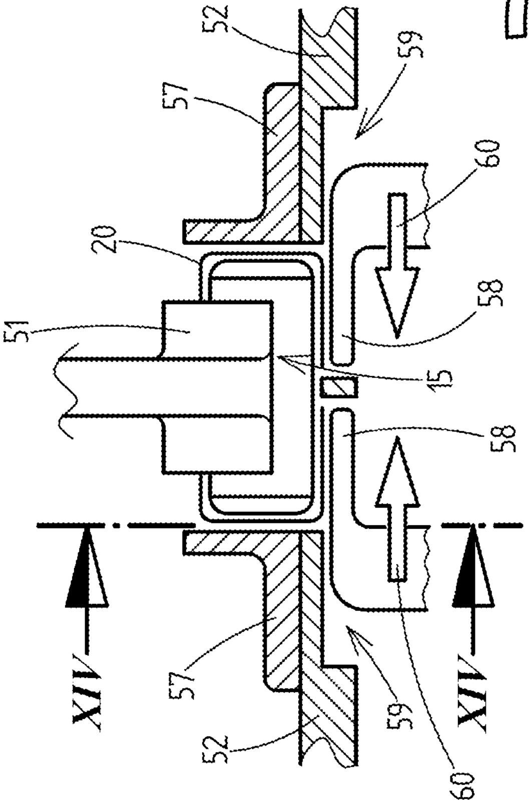
FIG. 13 shows a vertical section through the apparatus along the line of section XIII-XIII in FIG. 8.
Figure 16:
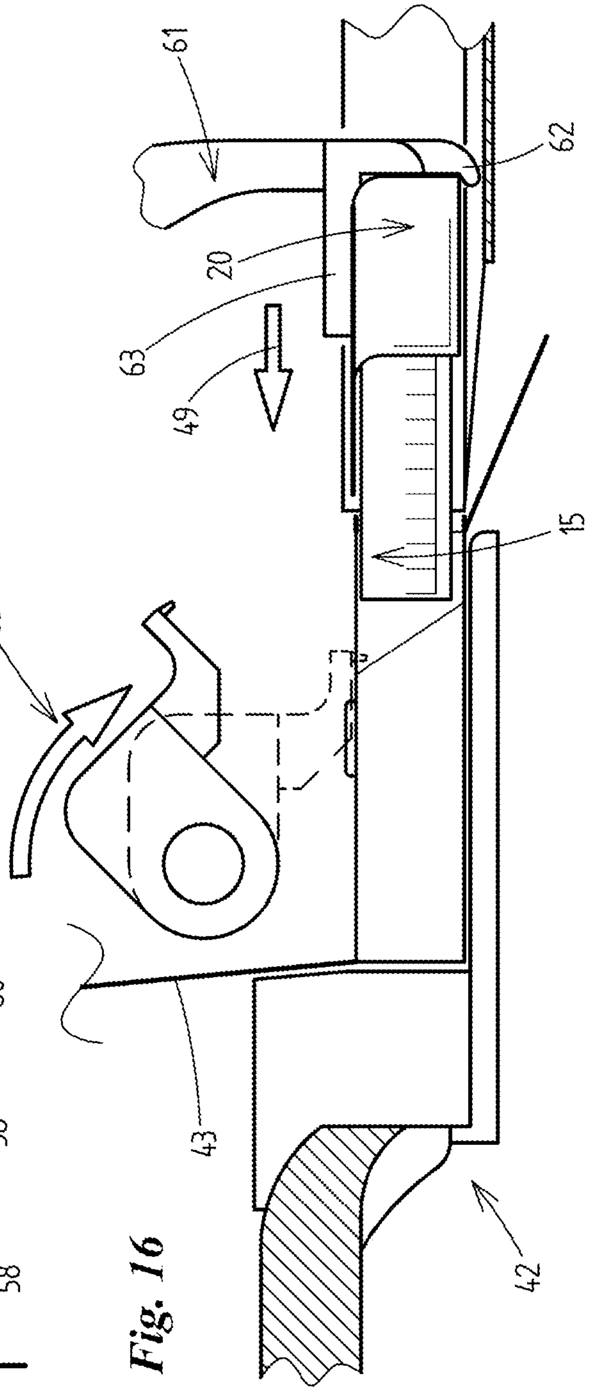
FIG. 16 shows a vertical section through the apparatus along the line of section XVI-XVI in FIG. 15.
Figure 15:
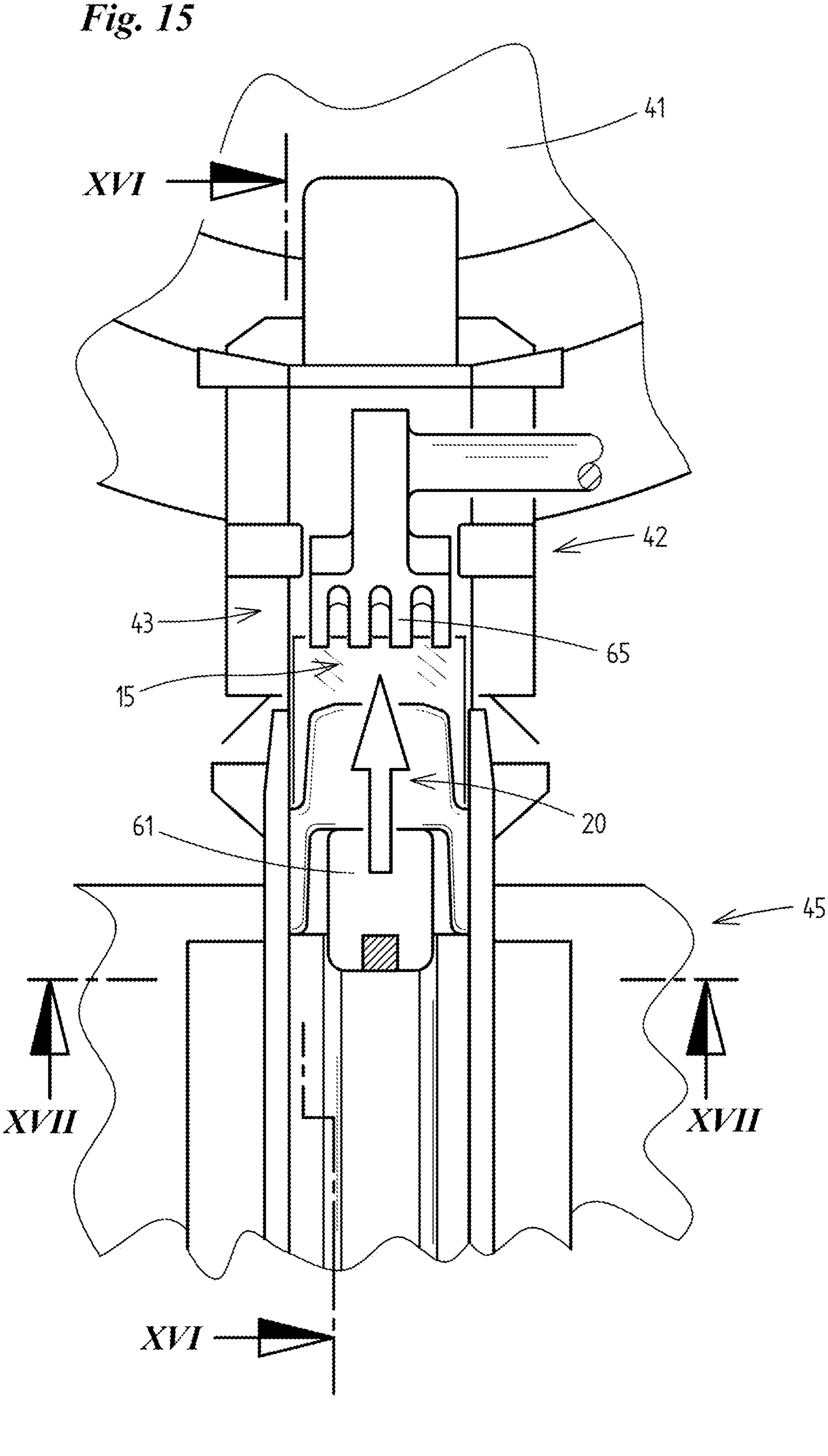
FIG. 15 shows a plan view of a portion of the apparatus in the region XV in FIG. 8.
Figure 17:
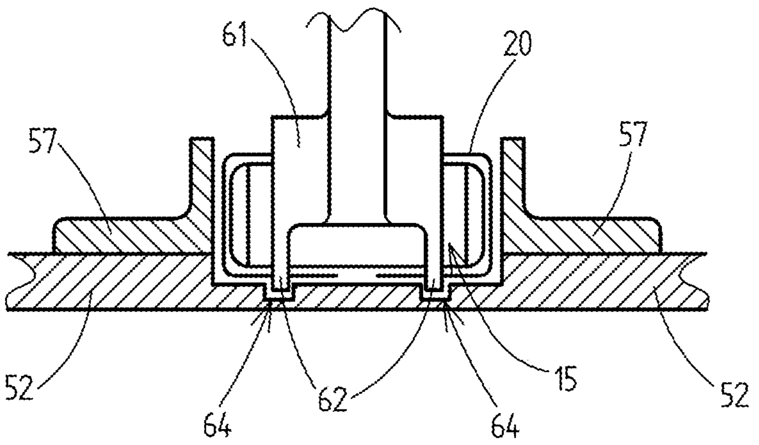
FIG. 17 shows a vertical section through the apparatus along the line of section XVII-XVII in FIG. 15.

As FIG. 9 on show, the packaging content 15 rests in this instance on a guide path 52 of the platform 45. The collar 20 in contrast is guided with spacing above the packaging content 15 by first resting on folding elements 53.

The folding elements 53 work together with a switch 54 and serve to fold the collar 20 during transport in a transport direction 49 around the folding elements 53 so that the collar side walls 22 and the adjacent walls are folded as far as the collar rear walls 23 through 90° with respect to the collar front wall 21.

Afterwards, the collar 20 comes into contact with one or more guides 55 which serve to place the partially folded collar 20 against the front side of the packaging content 15. In this position (FIG. 11), the collar rear walls 23 protrude beyond the rear side of the packaging content 15 and protrude through slots 56 in the guide path 52. The collar 20 is guided laterally in the region of the side faces of the packaging content 15 by guiding elements 57.

In the next (second) folding step, the collar rear walls 23 are folded against the rear side of the packaging content 15. To this end, there are provided below the guide path 52 two folding members 58 which carry out this folding operation.

The folding members 58 are arranged in a recess 59 of the guide path 52 and can be moved horizontally back and forth according to the arrows 60.

In the next step, the packaging content 15 with the collar 20 folded around it is pushed by means of a second sliding member 61 into the pocket 42 of the folding turret 41.

A specific feature in this instance is that the second sliding member 61 is constructed to retain the collar 20 on the packaging content 15. To this end, there are used, on the one hand, two prong-like retention members 62 of the sliding member 61 which engage in the region of the rear side around the packaging content 15. In the region of the front side of the packaging content 15, another plate-like retention member 63 is provided. In this manner, the collar 20 is retained in the region of the front side and the rear side of the packaging content 15. In the guide path 52, groove-like recesses 64 are formed for the retention members 62.

The operating method of the sliding members 51, 61 is further known from DE 198 47 433 A1 to which reference is made for the purposes of complete disclosure.

In the region of the pocket 42, there is further provided a collar type pressing member 65 which presses the folded collar 20 or the packaging content 15 into the partially folded blank 43.

During the onward transport on the folding turret 41, the blank 43 is further folded in conventional manner and ultimately pushed out together with the packaging content 15 and the collar 20. Subsequently, the packaging side walls 30 then still have to be folded in conventional manner.

LIST OF REFERENCE NUMERALS

10 Packaging
11 Box portion
12 Lid
13 Line hinge
14 Outer packaging
15 Packaging content
16 Cigarette group
17 Inner wrapper
18 Closure label
19 Gripping tip
20 Collar
21 Collar front wall
22 Collar side wall
23 Collar rear wall
24 Box front wall
25 Box side wall
26 Box rear wall
27 Packaging edge
28 Oblique packaging edge wall
29 Packaging front wall
30 Packaging side wall
31 Packaging rear wall
32 Weakening line (faint)
33 Weakening line (heavier)
34 Oblique collar edge wall (octagonal packaging)
35 Intermediate packaging wall
36 Intermediate collar wall
37 Oblique collar edge wall (rectangular packaging)
38 Recess
39 Tray
40 Lid brake
41 Folding turret
42 Pocket
43 Blank (outer packaging)
44 Beating member
45 Platform
46 Transport path
47 Transverse conveyor belt
48 Material web
49 Arrow/transport direction
50 Projection
51 Sliding member
52 Guide path
53 Folding element
54 Switch
55 Guide
56 Slot
57 Guide element
58 Folding member
59 Recess
60 Arrow
61 Sliding member
62 Retention member
63 Retention member
64 Recess
65 Collar type pressing member
66 Sliding member

The invention claimed is:

1. A packaging for products of the tobacco industry, wherein the packaging (10) has a box portion (11) and a lid (12) which is pivotably arranged on the box portion (11) by means of a line hinge (13), and wherein a packaging content (15) is arranged in the box portion (11), and wherein the packaging (10) has a collar (20) which at least partially surrounds the packaging content (15) at several sides and which protrudes with the packaging content (15) from the box portion (11) which is open at the top, wherein walls of the collar (20) extend from a front side of the box portion (11) up to the region of an opposing rear side of the box portion (11) on which the line hinge (13) is also located, wherein, to delimit walls of the collar (20), there are formed in the material of the collar (20) weakening lines (32, 33) which are configured to lead to a material weakening along the respective weakening line (32, 33), wherein the collar (20) has differently constructed weakening lines (32, 33) of which at least some lead to a differing degree of material weakening, and wherein the collar (20) has a collar front wall (21), collar side walls (22) and collar rear walls (23) which extend along corresponding walls of the box portion (11), namely along a box front wall (24), box side walls (25) and a box rear wall (26), and in that in the transition from the collar side walls (22) to the collar rear walls (23) and/or in the transition from the collar side walls (22) to the collar front wall (21) differently constructed weakening lines (32, 33) which lead to a differing degree of material weakening are arranged.

2. The packaging as claimed in claim 1, wherein, in a packaging (10) with chamfered packaging edges (27) or in a packaging (10) with right-angled packaging edges (27), there is arranged between the collar side walls (22) and the collar rear walls (23) an oblique collar edge wall (34, 37) which extends when viewed from above obliquely with respect to the respective collar side walls (22) and the collar rear walls (23), and in that the weakening lines (32) between the collar side walls (22) and the respective oblique collar edge wall (34, 37) have a lower degree of material weakening than the weakening lines (33) between the oblique collar edge walls (34, 37) and the collar rear walls (23).

3. The packaging as claimed in claim 2, wherein, in a packaging (10) with chamfered packaging edges (27), there is arranged in each case between the collar side walls (22) and the collar front wall (21) an oblique collar edge wall (34) which extends when viewed from above obliquely with respect to the respective collar side walls (22) and the collar front wall (21), and in that the weakening lines (32) between the collar front wall (21) and the adjacent oblique collar edge wall (34) in each case have a lower degree of material weakening than the weakening lines (33) between the oblique collar edge walls (34) mentioned and the respective adjacent collar side wall (22).

4. The packaging as claimed in claim 1, wherein, in a packaging (10) with rounded packaging edges (27), there is arranged in each case between the collar side walls (22) and the collar rear walls (23) a curved intermediate collar wall (36) which has preferably parallel creases which are arranged with short spacings as weakening lines, and in that weakening lines (32) in the transition from the collar side walls (22) to the respective intermediate collar wall (36) have a lower degree of material weakening than weakening lines (33) in the transition from the respective intermediate collar walls (36) to the collar rear walls (23).

5. The packaging as claimed in claim 4, wherein, in a packaging (10) with rounded packaging edges (27), there is arranged in each case between the collar side walls (22) and the collar front wall (21) a curved intermediate collar wall (36) which has preferably parallel creases which are arranged with short spacings as weakening lines, and in that weakening lines (32) in the transition from the collar front wall (21) to the adjacent intermediate collar walls (36) have a lower degree of material weakening than weakening lines (33) in the transition from the intermediate collar walls (36) mentioned to the adjacent collar side wall (22).

6. The packaging as claimed in claim 1, wherein weakening lines (33) with a larger degree of material weakening may be formed by scoring the material of the collar (22) and weakening lines (32) with a lower degree of material weakening may be formed by creasing the material of the collar (20).

7. The packaging as claimed in claim 1, wherein, as a result of the use of the weakening lines (32, 33) with a differing degree of material weakening, the folding behavior of the blank for the collar (20) can be influenced in such a manner that walls of the collar (20) which are located at weakening lines (32) with a lower degree of material weakening are more difficult to fold than walls of the collar (20) which are located at weakening lines (33) with a higher degree of material weakening.

8. The packaging as claimed in claim 1, wherein the collar rear walls (20) extend together over at least 10% of the width of the rear wall (26) of the box portion (11).

9. The packaging as claimed in claim 1, wherein the collar rear walls (20) extend together over at least 20% of the width of the rear wall (26) of the box portion (11).

10. The packaging as claimed in claim 1, wherein the collar rear walls (20) extend together over at least 30% of the width of the rear wall (26) of the box portion (11).

* * * * *